Dec. 25, 1934.  I. H. CRABTREE  1,985,629
MOTION PICTURE PROJECTING APPARATUS
Filed Feb. 13, 1931
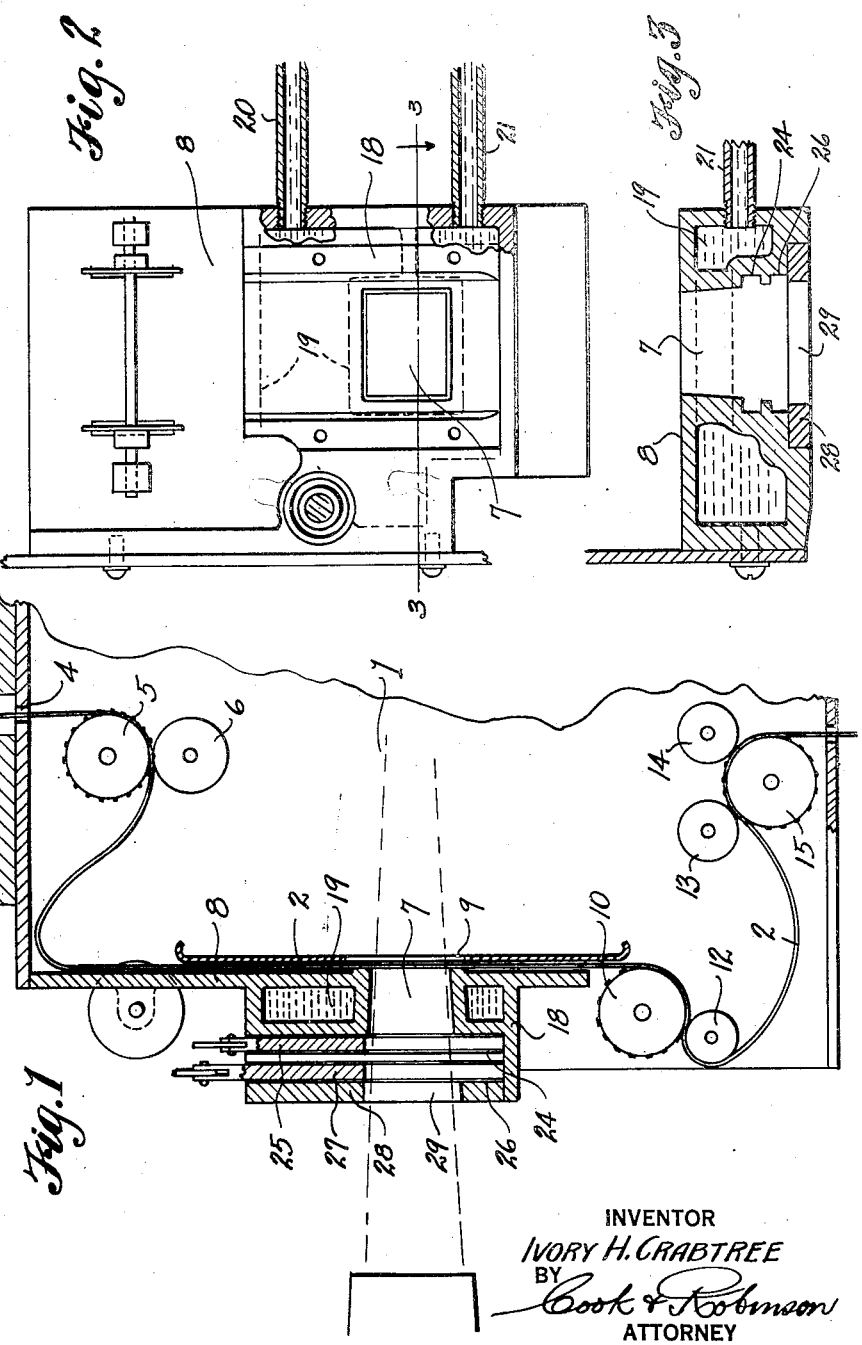
INVENTOR
IVORY H. CRABTREE
BY
Cook & Robinson
ATTORNEY Patented Dec. 25, 1934

1,985,629

UNITED STATES PATENT OFFICE 1,985,629

MOTION PICTURE PROJECTING APPARATUS

Ivory H. Crabtree, Toppenish, Wash.

Application February 13, 1931, Serial No. 515,486

1 Claim. (Cl. 88—17)

This invention relates to improvements in picture projecting machines such as are now in general use for the showing of motion pictures, and the improvement deals generally with the cooling of that part of the machine that becomes excessively heated by the light beam used for the projection of the picture.

It is the principal object of this invention to overcome the undesirable effects of heat from the projecting light beam and damage done to the projection apparatus, and to thus insure continued accuracy in the projection, by use of a film trap assembly for the projector which is designed to be kept cool by circulation of a cooling medium within it, such as water, air, or any other suitable cooling fluid.

More specifically stated, the present invention resides in the provision of a jacketed front or wall for the circulation of a cooling medium within the wall and about the aperture through which the light beam is projected and across which the picture film is moved.

It is also an object of the invention to provide a jacketed front of the above character that may be easily and readily applied to machines now in use without requiring any alteration in the machines as they now exist, except the removal of the present, uncooled front.

Other objects of the invention reside in the various details of construction, and in the combination of parts, and mode of operation, as will hereinafter be fully described.

In accomplishing these and other objects of the invention, I have provided the improved details of construction, the preferred forms of which are illustrated in the accompanying drawing, wherein—

Fig. 1 is a vertical, sectional view of a portion of a standard type of motion picture projecting machine equipped with a film trap assembly constructed and applied according to the present invention.

Fig. 2 is an elevation of the film trap assembly, the shutter, the dowser and retaining plate being removed for better illustration.

Fig. 3 is a cross sectional view taken substantially on the line 3—3 in Figure 1.

Referring more in detail to the drawing—

1 designates generally that part of a motion picture projecting machine containing the film feeding and advancing mechanism whereby the film strip is intermittently advanced across the path of the light beam. As shown in Figure 1, the film strip 2 passes into the housing from a storage reel designated at 3, through a slot 4 in the top wall of the housing and it is fed at the speed needed by a driven sprocket 5, against which the strip is held by an idler roll 6. The film strip is held properly in place for advancement across the aperture 7 of the front wall, or plate 8 of the film trap assembly, by a gate 9 and it is advanced intermittently by means of a sprocket wheel 10 which is intermittently driven by the usual Geneva gears and against which the film is held by a roll 12. After leaving the roll 12, the film strip is guided by rolls 13 and 14 and driven roll 15 through a slot 16 in the bottom wall of the housing 1 and may be then wound onto a reel for rewinding.

In so far as the film feeding, winding and advancing devices are concerned, they may be of the usual or any preferred construction and form no part of the present invention, and the plate or wall 8 in which is embodied the present invention is designed so that it may be applied to already existing machines, and will not necessitate any change in the location or mode of operation of these parts as they already exist; the present assembly simply replacing the uncooled assembly of the machine as heretofore used.

The present invention resides in the means for cooling the assembly, and for this purpose the wall plate 8 is formed about the usual aperture 7 with a jacket or housing 18 integral with the plate and forming a channel 19 entirely about the aperture, as shown best in Figure 2, for the circulation therein of a cooling medium, which preferably would be water, but which might be air, oil or any other fluid medium suitable for cooling. This medium, introduced by gravity flow or pressure otherwise produced, enters through a supply pipe 20 and leaves by way of pipe 21; these pipes being threaded onto openings provided therefor in the side wall of the jacket.

In the present instance, the jacket 18 is open forwardly of the aperture and is formed with a guideway 24 for the usual fire shutter 25, and with another guideway 26 for a dowser 27 used to cut off the light beam for a changeover operation. A cover plate 28 is fitted over these parts, as in Figure 3, and this is provided with an aperture 29 alined with aperture 7 for passage of the light beam.

The special advantages incident to the use of this device are that it does away with the usual, inefficient cooling plates and effectively cools that part of the machine which ordinarily becomes excessively heated by the light beam, thereby eliminating the cause of the plate warping out of shape and thus causing interference with the operation of parts associated therewith. It overcomes the distortion of pictures by reason of any curvature of the film caused by its being drawn across a guiding surface that has been warped by heat. Furthermore, it makes possible the easy threading of the film without danger of the operator being burned in doing this.

An important feature of the construction resides in the fact that the fire shutter is set out forwardly of the film and the water jacket placed back of it. This arrangement avoids overheating of the shutter even when the light beam is on it for a long time. The fact that it is farther removed from the film strip and kept cool in addition, removes any possibility of fire caused by shutter overheating, which is often the case in the old style machines. In the usual constructions, should the hand dowser be left open and the light beam be allowed to be turned on the fire shutter, the latter, being close to the film, will ignite it. Therefore, great care must be exercised not to leave the hand dowser open after striking the arc. With this arrangement danger is avoided, as the cooling jacket will keep the heat away from the film until the machine is fully up to speed and the dowser automatically closed by means such as those set forth in my co-pending application, Serial Number 399,949, filed October 16, 1929, entitled Changeover mechanism for motion picture machines.

The plate may be applied to already existing machines without necessitating any change, but for machines yet to be built, it would be original equipment.

Having thus described my invention, what I claim as new therein and desire to secure by Letters Patent, is:

An aperture plate for motion picture machines formed with an aperture across which a film strip may be drawn and having an integral portion at the outside extending from the plate about the aperture formed with a chamber encircling the aperture and provided with openings for connection with pipes for delivery of a cooling liquid into and from the chamber; said extension portion also being formed at the outside of the chamber with guide slots for containing shutters movable therein from and across the aperture.

IVORY H. CRABTREE.